May 12, 1964          N. Z. HOFFER          3,132,494
                      FLEXIBLE COUPLINGS

Filed Nov. 6, 1962                          3 Sheets-Sheet 2

INVENTOR.
NANDOR Z. HOFFER
BY Arthur Jacob
ATTORNEY

United States Patent Office 3,132,494
Patented May 12, 1964

3,132,494
FLEXIBLE COUPLINGS
Nandor Z. Hoffer, 326 Somerset St., New Brunswick, N.J.
Filed Nov. 6, 1962, Ser. No. 235,814
6 Claims. (Cl. 64—9)

The present invention relates generally to flexible couplings for use in coupling a pair of rotatable shafts and, more specifically, to flexible couplings which make use of complementary intermeshing teeth to provide flexible driving connections similar to those found in flexible couplings which have come to be known as "gear type" couplings.

Gear type couplings are generally employed in coupling rotatable shafts which are out of axial alignment. Such misalignment occurs when the longitudinal axes of the shafts to be coupled are at an angle to each other, or are parallel but laterally offset, or are at an angle and offset. In such a coupling, mating component parts are each mounted for rotation with one of the shafts and are provided with complementary teeth which are adapted to mesh, when the coupling is properly assembled, to maintain a driving connection between the shafts. The mating component parts are generally in the form of a hub provided with external teeth and resembling a spur gear and a sleeve having internal teeth and resembling a ring gear. When properly assembled, the hub is adapted to fit within the sleeve with the corresponding teeth on each component part meshing to provide the driving connection. Because of the misalignment in the shafts, the hub and sleeve elements will also be misaligned and there will be relative motion between the meshing teeth during rotation of the coupling due to the flexing of the driving connection through an angle proportional to the misalignment of the shafts. Clearance is provided between the teeth to allow such relative motion to take place without binding and to allow proper lubrication of the teeth. However, because commercial flexible couplings are generally designed to operate over a range of misalignment angles, rather than being individually tailored to a given angle of misalignment, it becomes a problem to find the proper amount of clearance which will allow maximum flexing without introducing adverse effects such as binding and excessive wear where misalignment is great and still maintain continuous contact between the teeth at lesser angles of misalignment. What may be the minimum desirable clearance for greater angles of misalignment may prove to be excessive for lesser angles of misalignment allowing lost motion, or "back-lash," and causing vibration or chatter due to intermittent contact between the teeth in a driving connection at such lesser angles. Moreover, greater clearance is generally obtained by sacrificing tooth thickness in the direction in which the driving force is transmitted and consequently the strength of the tooth is reduced as clearance is increased to allow for greater angles of misalignment.

Various tooth configurations have been proposed which are intended to alleviate the above outlined problem. However, no single proposed configuration appears to have been successful in providing for all of the difficulties encountered, and particularly those difficulties encountered in flexible couplings which must transmit relatively great amounts of power at relatively high speeds.

The flexible coupling of the invention makes use of known tooth configurations, but limits the misalignment in mating complementary sets of such teeth to relatively small angles of misalignment and relies upon increasing the number of such mating sets of teeth, or flexible driving connections, within the coupling to accommodate a relatively large overall misalignment in the shafts to be coupled.

It is therefore a principal object of the invention to provide a coupling which will allow the accommodation of an increased range of misalignment in rotatable shafts to be coupled without requiring a radical departure from known tooth forms employed in current gear type flexible couplings.

Another object of the invention is to provide a coupling which is easily assembled to provide a rugged unit which is less susceptible to wear, which will give smooth performance at relatively high speeds of operation and which is capable of transmitting relatively large amounts of power.

A further object of the invention is to provide a coupling having a minimum number of component parts, which parts may be economically manufactured on standard machinery.

It is to be understood that where the words "tooth" or "teeth" are employed throughout the specification and claims, these words are meant to include all tooth configurations which will allow complementary sets of such teeth to mesh and provide a proper flexible driving connection; that is, a driving connection which will allow a limited amount of misalignment between the axes of the connecting elements without introducing intolerable adverse effects, and encompass crowned, helical, and other gear teeth as well as specially contoured teeth.

The invention may be briefly described as a gear type coupling for use in coupling a pair of rotatable shafts, the coupling comprising means for providing at least three flexible driving connections between the pair of shafts.

The novel features of the invention both as to its structure and method of operation, as well as additional objects and advantages thereof, will be more fully understood from the following description of preferred embodiments thereof, when read in conjunction with the accompanying drawings in which.

Figure 1:
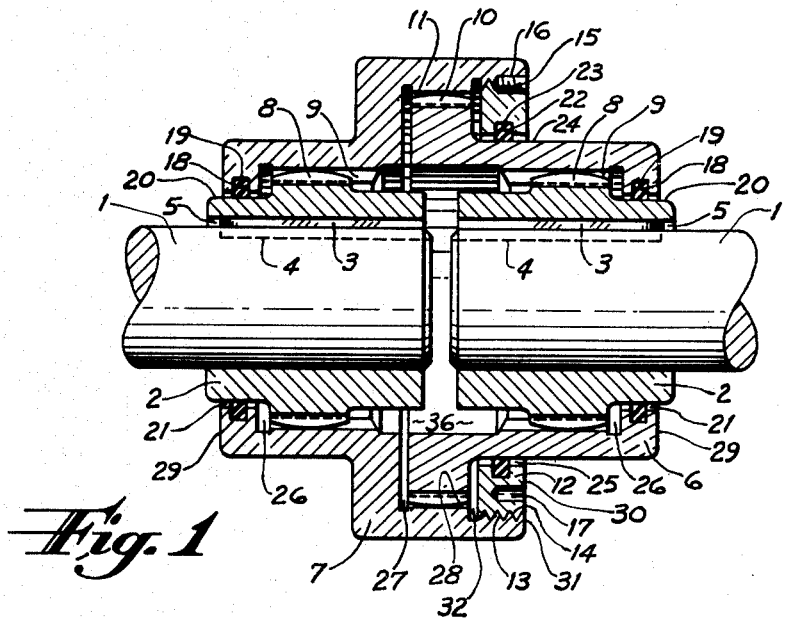
FIGURE 1 is a longitudinal sectional view of a coupling constructed in accordance with the invention mounted upon a pair of rotatable shafts which, for the sake of simplicity, are illustrated in axial alignment.

Referring now to FIGURE 1, a coupling constructed in accordance with the invention is shown coupling a pair of rotatable shafts 1. For the sake of simplicity, the shafts 1 are shown with their respective longitudinal axes aligned. Mounted upon each shaft 1 is a hub 2, each hub 2 having a generally annular configuration and being fixed for rotation with its respective shaft 1 by means of a key 3 which is seated in a slot 4 in shaft 1 and engages keyway 5 of hub 2.

Surrounding one of the hubs 2 is a first or inner sleeve 6 which is generally tubular. A second or outer sleeve 7, also tubular in shape, similarly surrounds the other hub 2 and has a flange portion which overlaps and receives a complementary shoulder portion of the inner sleeve 6.

In order to provide a mechanical connection between the shafts 1, a series of external teeth 8 are provided around the periphery of each hub 2, while a complementary series of internal teeth 9 are provided around the inner surface of sleeves 6 and 7. Hubs 2 resemble spur gears having external teeth 8 while sleeves 6 and 7 resemble ring gears having internal teeth 9, which teeth are adapted to mesh with one another to form the desired driving connections. A further driving connection is provided between inner sleeve 6 and outer sleeve 7 by means of a series of external teeth 10 formed in the shoulder portion of the inner sleeve 6 and adapted to mesh with a series of internal teeth 11 provided in the flange portion of outer sleeve 7.

Once the hubs 2 and sleeves 6 and 7 are assembled in their proper positions, as illustrated in FIGURE 1, the coupling assembly is completed by inserting end plate 12 into outer sleeve 7, the end plate being provided with threads 13 which engage threads 14 in the flange portion of outer sleeve 7. A set screw 15 is seated in hole 16 provided therefor in order to lock the end plate 12 in place. The insertion of the end plate 12 is facilitated by sockets 17 provided to receive a spanner wrench for turning the end plate until it reaches its predetermined position in the outer sleeve.

Annular seals 18 are seated in grooves 19 of the sleeves 6 and 7 and provide a seal between the cylindrical surfaces 20 and 21 of the hubs and sleeves, respectively, the cylindrical surfaces 20 and 21 being spaced from one another to allow a clearance for purposes which will be explained shortly. Likewise, a seal 23 is seated in groove 24 of the end plate 12 and provides a seal between spaced cylindrical surfaces 24 and 25 of the inner and outer sleeves, respectively.

Figure 2:
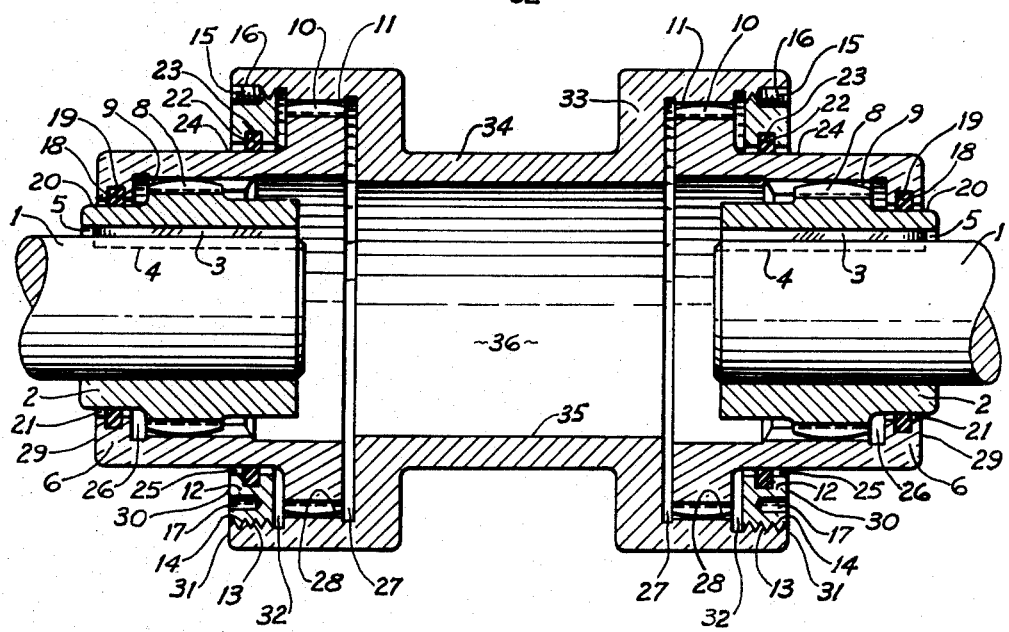
FIGURE 2 is a longitudinal sectional view of another coupling constructed in accordance with the invention mounted upon a pair of rotatable shafts spaced further apart than those of FIGURE 1.
Figure 4:
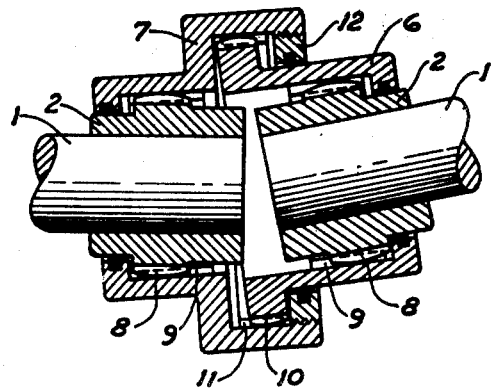
FIGURE 4 is a diagrammatic view of the coupling of FIGURE 1 mounted upon a pair of misaligned shafts.

In order to accommodate misalignment of the shafts 1, the driving connections effected at the meshing sets of teeth 8—9 and 10—11, respectively, are made flexible; that is, the longitudinal axis of each hub is capable of forming an angle with the longitudinal axis of its respective surrounding sleeve and the longitudinal axis of one sleeve is capable of forming an angle with the longitudinal axis of the other sleeve while still maintaining a proper driving connection (see FIGURE 4). The configuration of the meshing teeth must be such that the necessary flexing at these driving connections may be accomplished without introducing such adverse effects as binding, back-lash or weakening of the drive connection by the reduction of the tooth profile area or the area of contact with mating teeth. Since it is difficult to attain a tooth configuration which will meet these requirements over the sufficiently wide range of shaft misalignment possibilities which may be encountered in the employment of such couplings, the coupling of the invention has been devised to avoid the problem of specially contoured teeth by increasing the number of flexible driving connections. Referring to FIGURE 4, it will be apparent that since the total misalignment of shafts 1 will be taken up by the sum of the angles of misalignment between the hubs 2 and their respective surrounding sleeves 6 and 7 at teeth 8 and 9 and between the sleeves 6 and 7 at teeth 10 and 11, each angle of misalignment at each driving connection will be reduced in proportion to the number of flexible driving connections available. By increasing these flexible driving connections to three, as shown in FIGURE 1, or to four, as shown in FIGURE 2, the angle of misalignment at each flexible connection and, hence, the actual flexing which takes place at each connection, remains sufficiently small over a wide enough range of shaft misalignment possibilities so that the configuration of each tooth need not depart radically from a standard gear tooth to avoid the above outlined adverse effects. As a result, smoother operation is attained along with greater power transmission capabilities. Less flexing at each driving connection gives rise to reduced frictional effects in each connection allowing higher speeds of operation and reduced wear with increased ease of lubrication. Because the teeth may be fabricated readily on standard gear cutting machinery, economy of manufacture is realized. On the other hand, crowned, spherical surfaced or other specially contoured teeth may be employed to increase the amount of misalignment that may be accommodated over and above the increase attained by increasing the number of flexible driving connections.

Allowing flexing to take place at the driving connections (as shown in FIGURE 4) necessitates the provision of the aforementioned clearance between the cylindrical surfaces at 20, 21, 24 and 25. Further clearance is provided within the coupling assembly at undercut portions 26 of the internal surface of the sleeves to provide for the angular movement of teeth 8 relative to teeth 9. A further undercut portion 27 is located adjacent teeth 11 and extends into sleeve 7 slightly beyond root 28 of teeth 11. In the configuration of FIGURE 1, end walls 29 are integral with the sleeves and undercut portions 26 allow angular movement of hubs 2 relative to the sleeves without interference while undercut portion 27 allows relative angular movement of the sleeves without interference.

End plate 12 is relied upon to provide a complete coupling end wall when surface 30 of plate 12 is brought flush with surface 31 of sleeve 7. When end plate 12 is in this predetermined position, further clearance is provided by undercut portion 32, which extends beyond the root of threads 14 to allow proper location of end plate 12 within sleeve 7, as well as beyond the root 28 of teeth 11 to allow angular movement of teeth 10 relative to teeth 11 and relative angular movement of the sleeves without interference.

In the embodiment of the invention shown in FIGURE 2, the shafts 1 are spaced apart and a configuration having four flexible driving connections is illustrated. In this configuration, the hubs 2 are identical to those in FIGURE 1, as are the inner sleeves 6 which now surround each hub 2. An outer intermediate connecting member shown in the form of sleeve 33 is provided with flange portions adapted to receive the shoulder portions of sleeves 6 and a spacer portion 34 which may be made any suitable length to span the distance between the inner sleeves 6. The outer sleeve 33 is generally tubular with inner surface 35 corresponding in diameter to the inner surfaces of sleeves 6. Teeth 11 in each flange portion of outer sleeve 33 are adapted to mesh with complementary teeth 10 of the sleeves 6 and provide flexible driving connections which, together with the flexible driving connections provided by meshing complementary teeth 8 and 9, serve to mechanically couple shafts 1. End plate 12 and seals 18 and 22 are provided to complete a sealed coupling assembly as set forth in the above description of the embodiment shown in FIGURE 1.

The interior of the couplings illustrated in FIGURES 1 and 2 are sealed by means of seals 18 and 22 which thereby provide a sealed chamber 36 wherein a lubricant is contained and allowed to circulate throughout the flexible driving connections to provide proper lubrication for these connections. Such lubrication is facilitated by the undercut portions 26, 27 and 32 which allow a sufficient amount of lubricant to circulate through the meshed teeth during rotation of the shafts. The seals 18 and 22 must be resilient enough to allow the required amount of flexing to take place at each driving connection while still maintaining the seal between surfaces 20, 21, 24 and 25 intact. While conventional gear type couplings are presented with a problem in finding a seal that can withstand large amplitudes of continuous compression and expansion, the coupling of the invention alleviates this problem by decreasing the amplitude of such flexing so that conventional seals become adequate.

It is noted that the construction of the illustrated embodiments of the invention requires only a minimum number of component parts thus facilitating ease of assembly and aiding in maintaining a smooth operating coupling. To this end, inner sleeve 6 is constructed of a single integral structure while outer sleeve 7 requires merely the insertion of end ring 12 to complete the assembly. By maintaining such a small number of component parts and restricting these parts to relatively small diameter annular configurations, the problem of balancing the assembled coupling for smooth, relatively high speed operation has been minimized. The employment of end plate 12 in conjunction with outer sleeve 7 eliminates the need for drilled flanges and nuts and bolts which are common in known gear type couplings and which present a problem in assembling and balancing such couplings for high speed use. In the coupling of the invention, very precise balance may be obtained with minimum effort in the assembly procedure. The fewer number of simplified component parts also represents economy in manufacture.

Figure 3:
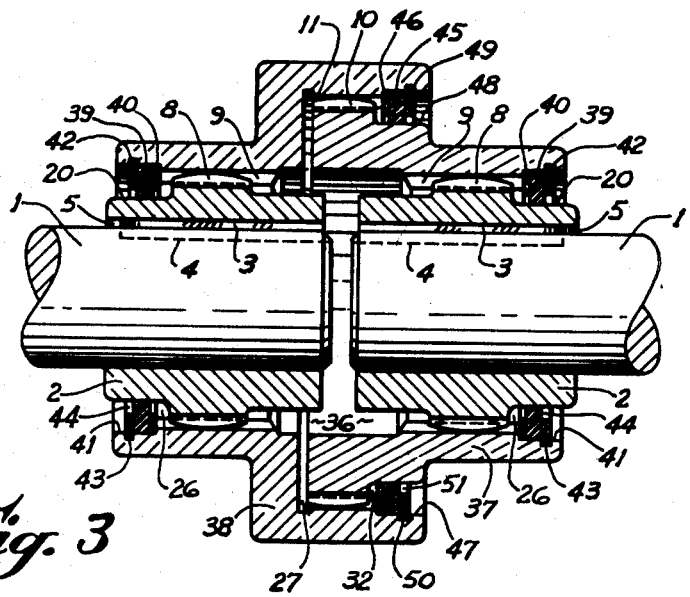
FIGURE 3 is a longitudinal sectional view of an alternative construction for the coupling of FIGURE 1.

The embodiment illustrated in FIGURE 3 presents an alternative arrangement of component parts in a coupling which may find use in applications where the assembly or disassembly procedure requires that the sleeves be movable to positions along the shafts relative to the hubs that would not be possible in the embodiment of FIGURE 1 due to the integral end walls 29 of the sleeves 6 and 7. Thus, sleeves 6 and 7 are replaced by corresponding sleeves 37 and 38 in FIGURE 3, while hubs 2 remain identical. Seals 39, along with shields 40, are seated upon inner surfaces 41 of the sleeves and held in place by retainer rings 42 which may be snapped into place in grooves 43 when the sleeves are in a properly assembled position. Cylindrical surfaces 44 correspond to surface 21 in FIGURE 1 and provide necessary clearance as explained hereinbefore. Similarly, the seal 22 and end plate 12 in the configuration of FIGURE 1 are replaced in FIGURE 3 by seal 45 and shield 46 which are seated upon internal surface 47 of sleeve 38 and held in place by retainer ring 49 which is snapped into place in groove 50 provided therefor. Cylindrical surface 51 provides the clearance which is provided in FIGURE 1 by surface 25. The shields 40 and 46 serve to protect seals 39 and 45, respectively, from coming into contact with teeth 8 and 10, respectively, during flexing of the driving connections provided at the meshing sets of teeth 8—9 and 10—11.

Figure 5:
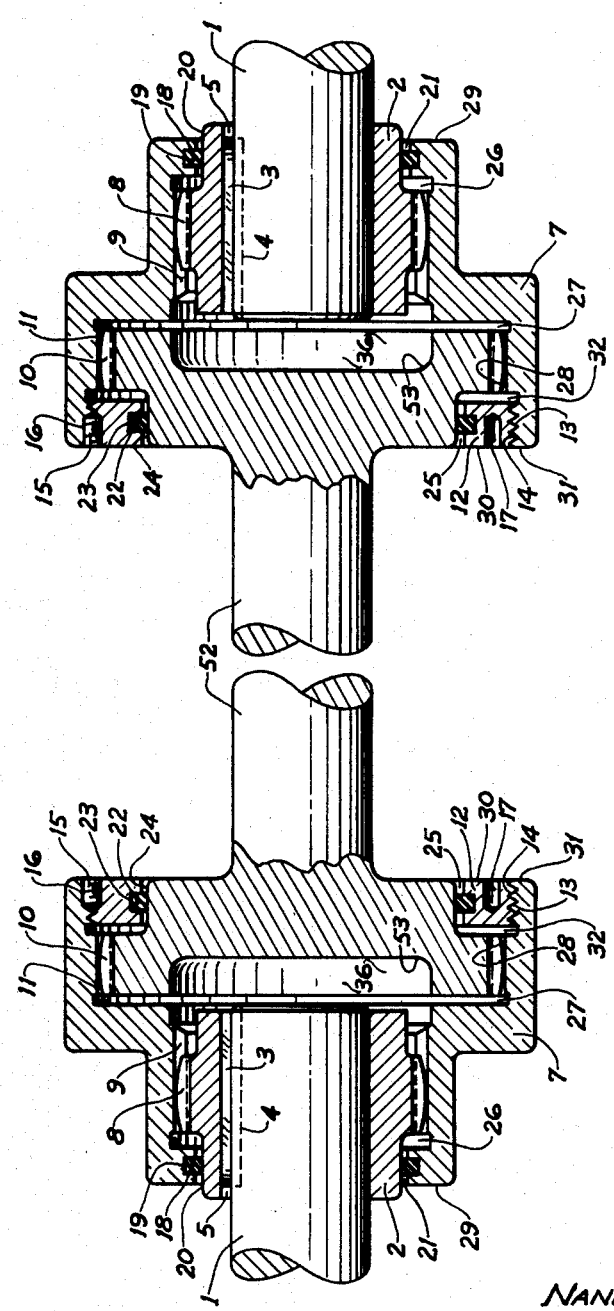
FIGURE 5 is a longitudinal sectional view of still another coupling constructed in accordance with the invention.

The embodiment illustrated in FIGURE 5 comprises a coupling having four flexible driving connections and is adapted for use where shafts 1 are spaced a considerable distance apart. Hubs 2 are fixed to shafts 1, and outer sleeves 7 surround each hub 2 in a manner described hereinbefore. The flange portions of outer sleeves 7 now receive shoulder portions of an intermediate connecting member shown in the form of connecting shaft 52 and the meshing sets of teeth 8—9 and 10—11 provide four flexible driving connections to mechanically couple the shafts 1. Internal surface 53 of the connecting shaft 52 completes identical chambers 36 for containing a lubricant for the flexible driving connections therein. The seals and end plates are identical to those set forth in the description of the embodiments of FIGURES 1 and 2 and the same reference characters have been applied so that reference may be made to said descriptions.

It is to be understood that the above detailed description of preferred embodiments of the invention is provided by way of example only and is not intended to restrict the invention. Various details of design and construction may be modified without departing from the true spirit and scope of the invention as defined in the appended claims.

I claim:

1. A gear type flexible coupling capable of effectively coupling a pair of rotatable shafts over a relatively wide range of shaft misalignment, such misalignment including laterally offset longitudinal shaft axes as well as shaft axes at an angle to one another, said coupling comprising:

[A] a first hub capable of being mounted for rotation with the first of said pair of shafts and having first teeth;
   [B] a second hub capable of being mounted for rotation with the second of said pair of shafts and having second teeth;
   [C] a first sleeve having teeth complementary to said first teeth for meshing with said first teeth to provide a first flexible driving connection between the first hub and the sleeve, said sleeve having a longitudinal length greater than the longitudinal extent of the meshing teeth and an end wall extending laterally inwardly beyond said first teeth toward the first shaft to enclose the meshing teeth within the coupling;
   [D] a second sleeve having teeth complementary to said second teeth for meshing with said second teeth to provide a second flexible driving connection between the second hub and the second sleeve, said second sleeve having a longitudinal length greater than the longitudinal extent of these meshing teeth and an end wall extending laterally inwardly beyond said second teeth toward the second shaft to enclose the meshing teeth within the coupling; and
   [E] means for providing at least one further flexible driving connection between the first and second sleeves, said means including further teeth on each said sleeve, said further teeth of at least one sleeve being longitudinally displaced from the complementary teeth on that sleeve and the further teeth of both sleeves being laterally displaced from said complementary teeth, said means being independent of any further mechanical connection with the shafts so as to be capable of accommodating said offset as well as said angular misalignment.

2. A coupling of claim 1 wherein said further teeth of each sleeve are located a greater lateral distance, respectively, from each said shaft than said first and second teeth.

3. A coupling of claim 1 wherein the further teeth of the first sleeve are complementary to the further teeth of the second sleeve for meshing with one another to provide said further flexible driving connection.

4. A coupling of claim 3 wherein said further teeth of each sleeve are located a greater lateral distance, respectively, from each said shaft than said first and second teeth.

5. A coupling of claim 1 wherein said means includes an intermediate, longitudinally extending, connecting member, said member having teeth adjacent each end, said teeth being complementary with the further teeth on each said sleeve for meshing with said further teeth to provide third and fourth flexible driving connections, said member being independent of any further mechanical connection with the shafts so as to be capable of accommodating said misalignment.

6. A coupling of claim 5 wherein said further teeth of each sleeve are located a greater lateral distance, respectively, from each said shaft than said first and second teeth.

References Cited in the file of this patent

UNITED STATES PATENTS

| 1,905,431 | Banner | Apr. 25, 1933 |
| 1,961,426 | Morgan | June 5, 1934 |
| 2,924,954 | Panhard | Feb. 16, 1960 |
| 3,070,979 | Shipley et al. | Jan. 1, 1963 |

OTHER REFERENCES

German printed application 1,045,160, printed November 27, 1958. (Only FIG. 1 of dwg. relied on.)